United States Patent [19]
Malvern et al.

[11] Patent Number: 5,610,714
[45] Date of Patent: Mar. 11, 1997

[54] OPTICAL GYROSCOPE

[75] Inventors: Alan R. Malvern; Barry V. W. Isaacs, both of Plymouth, Great Britain

[73] Assignee: British Aerospace Public Limited Company, Hampshire, Great Britain

[21] Appl. No.: 648,883

[22] Filed: May 16, 1996

[30] Foreign Application Priority Data

May 18, 1995 [GB] United Kingdom .................. 9510054

[51] Int. Cl.⁶ ................................................. G01N 21/64
[52] U.S. Cl. ............................................................ 356/350
[58] Field of Search ............................................. 356/350

[56] References Cited

U.S. PATENT DOCUMENTS 4,883,358  11/1989  Okada ..................................... 356/350

FOREIGN PATENT DOCUMENTS 227600  9/1994  United Kingdom .

*Primary Examiner*—Vincent P. McGraw
*Attorney, Agent, or Firm*—Cushman, Darby & Cushman IP Group of Pillsbury Madison & Sutro LLP

[57] ABSTRACT

An optical gyroscope includes an optical fibre ring or coil (2) around which light may propagate in clockwise and counter-clockwise directions, means (1, 3, 4, 5, 6) for inputting a beam of light in either direction into the coil (2), a phase modulator (7) for generating and applying a phase modulation at a modulation frequency between the clockwise and counter-clockwise beams, a detector (8) for detecting the combined clockwise and counter-clockwise beams and processing means for monitoring the intensity of the output of the detector means (8) at a plurality of integral multiples of the modulation frequency to determine the rate applied to the gyroscope. The processing means includes an analogue to digital converter (13) for receiving the detector analogue output on a single channel, a data accumulation device (20) for dividing the output from the converter (13) into a number of time samples and accumulating a succession of time samples over a number of cycles of the modulation frequency, means (15, 16) for synchronising modulation frequency to the analogue to digital converter sampling frequency and to the data accumulation device frequency, and a digital signal processor (21) for receiving data from the data accumulation device (20) extracting therefrom frequency components at modulation frequency, double modulation frequency and quadruple modulation frequency and calculating therefrom the rate corrected for phase modulation and amplitude effects.

7 Claims, 2 Drawing Sheets

OPTICAL GYROSCOPE

FIELD OF THE INVENTION

This invention relates to an optical gyroscope and in particular, but not exclusively, to an open loop fibre optic gyroscope.

BACKGROUND OF THE INVENTION

In a fibre optic gyroscope a clockwise (CW) beam and a counter-clockwise (CCW) beam of light pass round a coil of optical fibre and are brought together on leaving the coil to interfere on a detector. When rotation is applied to the gyroscope a rate-related non-reciprocal phase shift is introduced between the CCW and CCW beams which varies the intensity on the detector.

With such fibre optic gyroscopes there is a need for accuracy and improving this accuracy often entails a considerable increase in cost. One way of achieving good accuracy has been by the use of a conventional closed loop fibre optic gyroscope which has the disadvantage of using expensive lithium niobate integrating optic circuits in the optics to give the required broadband phase modulation which is generally in two parts. Whilst this type of gyroscope gives a good performance over a high rate range it is relatively complex, requires precision modulators and is thus relatively expensive to manufacture.

OBJECTS OF THE INVENTION

One object of the present invention is to provide a generally improved optical gyroscope with reasonable accuracy at a reasonable production cost. The open loop type of fibre optic gyroscope is of generally simpler construction than the closed loop gyroscope which could in theory lead to a reduction in cost but conventional open loop fibre optic gyroscopes are not thought to offer a sufficiently accurate performance for use even in medium accuracy applications. It is therefore a further object of the present invention to provide an open loop fibre optic gyrocope of relatively low cost but of improved performance approaching that of the more expensive closed loop fibre optic gyroscope.

These and other objects and advantages of the present invention will become more apparent from details disclosed in the following specification where preferred embodiments of the invention are described.

SUMMARY OF THE INVENTION

According to one aspect of the present invention there is provided an optical gyroscope, including means defining a coil or ring around a sensing axis, around which coil or ring light may propagate in clockwise and counter-clockwise directions, beam input means for inputting a clockwise beam and a counter-clockwise beam of light into the coil or ring to propagate in opposite directions around the coil or ring, a phase modulator for generating and applying a phase modulation at a modulation frequency between the clockwise and counter-clockwise beams, means for combining the clockwise and counter-clockwise beams after passage around the coil or ring, detector means for detecting the combined clockwise and counter-clockwise beams, and processing means for monitoring the intensity of the output of the detector means at a plurality of integral multiples of the modulation frequency to determine the rate applied to the gyroscope, which processing means includes an analogue to digital converter for receiving the analogue output of the detector means and providing a digital output data stream which contains integral multiples of the modulation frequency, a data accumulation device for receiving the output data stream, dividing it into a number of time samples and accumulating a succession of time samples over a number of cycles of the modulation frequency to improve the signal to noise ratio of selected integral multiple frequencies in the received data stream, means for synchronising modulation frequency to the analogue to digital converter sampling frequency and to the data accumulation device frequency, and a digital signal processor for receiving data from the data accumulation device, extracting therefrom frequency components at modulation frequency, double modulation frequency and quadruple modulation frequency, and calculating therefrom the rate corrected for phase modulation and amplitude effects.

Preferably the analogue to digital converter is a 12 bit converter operable to receive the detector means output with the three frequency components at modulation frequency, double modulation frequency and quadruple modulation frequency, via a preamplifier which outputs a phase modulated spectra of even and odd harmonics of the fundamental at modulation frequency direct to the analogue to digital converter via a single analogue channel.

Conveniently the data accumulation device is a histogrammer.

Advantageously the means defining the coil or ring is a telecommunications grade optical fibre.

Preferably the source of light for the optical fibre is a light emitting diode or a super luminescent diode.

Conveniently the phase modulator includes a cylinder of piezoelectric material around which is wrapped and secured thereto part of the optical fibre, and means for applying a voltage to the cylinder.

Advantageously the data accumulation device is governed by an algorithm which is implemented in software.

DESCRIPTION OF THE DRAWINGS

For a better understanding of the present invention and to show how the same may be carried into effect, reference will now be made, by way of example, to the accompanying drawings in which.

DESCRIPTION OF EMBODIMENTS OF THE INVENTION

Figure 1:
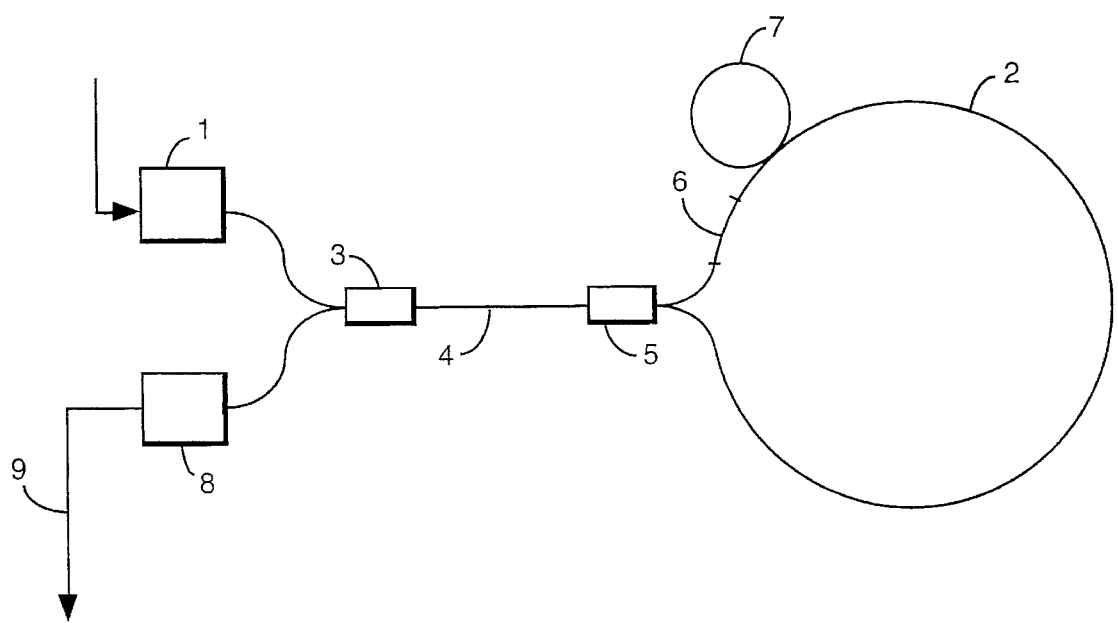
FIG. 1 is a schematic diagram of an open loop interferometric fibre optic gyroscope according to the present invention.

Referring now to FIG. 1 of the accompanying drawings, an open loop interferometric optical gyroscope according to the present invention uses low cost optics. The gyroscope includes a source 1 of light, conveniently a light emitting diode such as an edge light emitting diode (ELED) or a super luminescent diode (SED) to provide a light beam at typically 100 microwatts of power. Means, conveniently in the form of a loop of telecommunications grade optical fibre 2 are provided defining a coil or ring around a sensing axis, around which fibre coil or ring 2 light may propagate in CW and CCW directions from the source 1. To this end the light beam from the source 1 is fibre coupled to a 50:50 coupler 3 and from thence through a polariser 4 to another 50:50 coupler 5 which splits the beam into a CW and a CCW beam components. The CW beam component goes to a depolariser 6 provided in the CW inlet end of the fibre ring or coil 2 and from thence to a phase modulator 7 for generating and applying a phase modulation at a modulation frequency between the clockwise and counter-clockwise beams. The couplers 3 and 5 and polariser 4 form part of beam input means for inputting the clockwise and counter-clockwise beams of light into the fibre coil or ring 2 to propagate in opposite directions around the coil or ring. The depolariser 6 and phase modulator 7 may be combined if desired.

Conveniently the depolariser 6 is made from two lengths (typically one and two meter lengths) of high birefringence optical fibre wrapped around the phase modulator 7.

Thus the coupler 5 splits the light beam into a CW and a CCW beam which are passed into the opposite ends of the fibre optic coil 2 which typically has a length of 200 meters and a diameter of 70 millimeters. After the CW and CCW beams have passed around the coil they are recombined by the coupler 5 and passed via the polariser 4 and coupler 3 to a photodetector 8 which is a low noise detector conveniently made of silicon or gallium indium arsenide to give high speed and low noise and conveniently operated at a wavelength of 1300 nanometers.

The phase modulator 7 includes a cylinder of piezoelectric material around which is wrapped and secured thereto such as by gluing, part of the optical fibre 2 making up the coil or ring. This technique avoids the use of lithium niobate chips customarily employed in closed loop gyroscopes and considerably reduces the cost. Phase modulation is achieved by applying a voltage to the cylinder to cause periodic stretching of the fibre which imparts an AC phase modulation which is set to be equal to the synchronous frequency. At this frequency various errors such as the second harmonic distortion of the piezo, and intensity modulation induced by the piezo are eliminated so that by driving the phase modulator with an accurate sine wave having very low harmonic distortion level it is possible to provide a very low error system which considerably improves the accuracy of the gyroscope of the present invention.

The frequency of 468 kHz is very near to the inverse of twice the loop transit time to give a $\pi$ phase differential between the CW and CCW beams. This minimises harmonic distortion intensity modulation effects.

The phase modulator 7 is located in the CW inlet end of the coil so that the CW beam is phase modulated before entry into the coil and the CCW beam is phase modulated on leaving the coil. As the coil uses a telecommunication grade optical fibre 2 with the depolariser 6 to eliminate polarisation fading this also has the effect of being significantly cheaper than the high birefringence optical fibre that is usually used to be interfaced to lithium niobate chips in a closed loop gyroscope.

Further error reductions can be effected by appropriate choice and design of the components of the optical system shown in FIG. 1. Thus a thermo cooler 10 forms part of the drive to the source 1 to stabilise the temperature of the source. This is important to maintain the stability of the output power which normally varies with temperature and it stabilises the source wave length which typically varies by 400 parts per million per degree centigrade. With a suitable stabilisation circuit it is possible to achieve 0.1 degree centigrade stability which gives a corresponding stability of the scale factor of the gyroscope. Additionally the phase modulator 7 is provided with a piezo driver 11 which gives a very good sine wave drive at 468 kHz with very low second harmonic distortion. The frequency is tuned to match the length of the coil provided by the fibre 2 so that there is exactly $\pi$ phase shift around the coil due to the finite speed of light.

The gyroscope according to the present invention also includes processing means for monitoring the intensity of the output 9 of the detector 8 at a plurality of integral multiples of the modulation frequency to determine the rate applied to the gyroscope. The light received by the photodetector 8 is converted to a voltage which forms the output signal 9 which is fed to an optional preamplifier/buffer 12 so that the band width of the preamplifier/buffer 12 and detector is typically greater than 10 MHz so that there is little relative phase shift or amplitude variation between the three frequency components at modulation frequency, double modulation frequency and quadruple modulation frequency. The processing means is based on the extraction of the three frequency components by Fourier analysis. For a fibre coil length of 200 meters the modulation frequency is about 468 kHz. As is conventional having obtained the three frequency components two ratios are taken of modulation frequency to double modulation frequency and double modulation frequency to quadruple modulation frequency to eliminate the variation of source power and the modulation depth of the phase modulator 7 and to extract the rate.

The amplitude variation between the three frequency components will tend to be fixed as it is set by the fixed bandwidth characteristic of the detector 8 and preamplifier 12. The voltage 9 is fed either by way of the preamplifier 12 or directly in the absence of a preamplifier 12 to an analogue to digital converter (ADC) 13. The ADC 13 is clocked at 16 times the modulation frequency (7.5 MHz). This is provided by a master clock 15 operating at 15 MHz which produces an output Signal 15a which is halved at 16 and fed into the ADC at 16a so that 16 samples are created for each cycle of the modulation frequency. As this is synchronous there is no aliasing down of spurious frequency components into the frequency of interest.

The output of the preamplifier 12 is a phase modulated spectra comprising even and odd harmonics of the fundamental at modulation frequency. The ADC 13 is a 12 bit converter which receives the detector output 9 with the three frequency components at modulation frequency, double modulation frequency and quadruple modulation frequency via the optional preamplifier 12 which outputs the phase modulated spectra of even and odd harmonics of the fundamental at modulation frequency direct to the ADC 13 via a single analogue channel. The ADC 13 typically has an operational range of ±1 V while the output of the preamplifier 12 is typically ±0.5 V.

Figure 2:
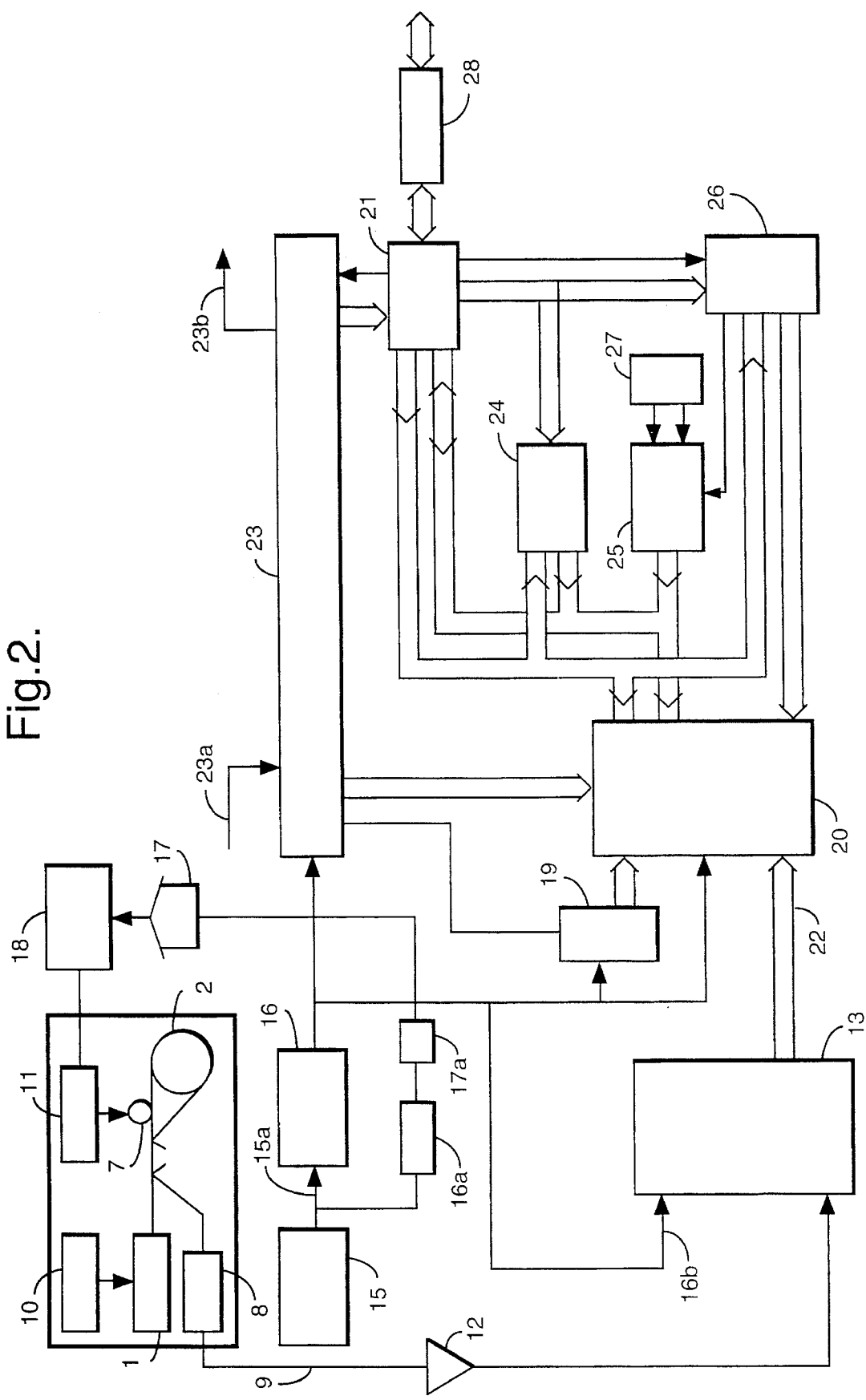
FIG. 2 is a schematic block diagram of one example of electronics for use with the gyroscope of FIG. 1.

The signal recovery system utilises digital signal processing as shown in FIG. 2. As described before all the frequencies are derived from the master clock 15 which operates at 15 MHz and divided by 2 at 16 to give the 7.5 MHz clock required for the ADC 13 convert pulse.

The 15 MHz signal is passed to a 5 bit counter 16a. The 5 bit output from the counter addresses a look up table 17a which contains 32 values representing a complete cycle at 468 kHz. The digital output signal from table 17a is converted to analogue at the 8 bit digital to analogue converter 17 to give the 468 kHz signal at 18 used to drive the phase modulator 7 via the piezo driver 11. The divider 16, counter 16a and table 17a act in conjunction with the converter 17 and an 8 bit counter 19 feeding into the histogrammer 20, as means for synchronising modulation frequency to the ADC sampling frequency and to the data accumulation device frequency. As shown in FIG. 2 the digital to analogue converter 17 is an 8 bit DAC. The signal from the converter 17 then passes through a low pass filter to eliminate the thirtysecond harmonic at 15 MHz, and an amplifier (not shown) to give the pure sine wave necessary to drive the piezo of the phase modulator 7.

FIG. 2 shows the use of the histogrammer 20 which slows down the data rate into a digital signal processor 21 by averaging over a sample interval and thus removing noise without loss of signal or resolution of small rates. The digital output data stream from the ADC 13, which contains integral multiples of the modulation frequency, is fed to the histogrammer 20 which divides the stream into a number of time samples and accumulates a succession of the time samples over a number of cycles of the modulation frequency thereby to improve the signal to noise ratio of selected integral, multiple frequencies in the received data stream. The data accumulation device is governed by an algorithm which can be implemented in software as an alternative.

The parallel digital output stream 22 from the ADC 13 is fed to the histogrammer 20 which is used to accumulate data over a 981 milliseconds interval corresponding to 460 samples per bin. There are 16 bins, with each bin taking a successive sample and this sample is then summed and averaged over a 1 millisecond interval. Thus there are 16 samples over the complete cycle of the modulation with each being the average of the 460 individual ADC samples. This reduces the noise and slows the data rate into the processor 21. At the end of the sample interval of 981 milliseconds the 16 averaged data points are transferred quickly to the signal processor 21 in about 10 microseconds. This gives time within the next millisecond period for determination of rate from the previous set of data.

The method of processing is as follows. There is a look up table within the software of sine waves at modulation, double modulation and quadruple modulation frequencies to span the complete cycle of a modulation frequency cycle. The 16 data bins are summed and multiplied by also sine and cosine waves to give rise to the Fourier components at these frequencies as real and imaginary parts. Thus the phase shift of the piezo modulator can be eliminated by taking the modulus of the complex Fourier transforms.

The phase only needs to be known to within $\pm/\pi$ so that the sign of the modulus can be determined, which in turn determines the sign of the rate. As long as the phase of the piezo and the drive electronics does not change by more than $\pm/\pi$ the sign of the rate will be well determined. This only applies to the modulation frequency and double modulation frequency components, as the modulus of the quadruple modulation frequency is all that is needed to determine the depth of the phase modulation from the ratio of the double to the quadruple modulation frequency. These are the analogues of the three frequency components which were determined in the conventional analogue scheme. Ratios are then taken of double to quadruple modulation frequency (to determine the phase modulation amplitude) and modulation to double modulation frequency to determine the rate, having first removed the effects of the phase modulation amplitude which appears by virtue of Bessel functions. The rate, in terms of a phase, can then be extracted by using the inverse tangent function of the ratio of modulation frequency to double modulation frequency signals to within $\pm/\pi$. To span a greater range, then $2\pi$ has to be added or subtracted. This can easily be determined as there is a two $\pi$ phase Jump at the boundary.

Thus for increasing positive rate the phase jumps down by $2\pi$, and for increasing negative phase there is a $2\pi$ phase increase. This jump can be spotted in software and the appropriate $2\pi$ added or subtracted. In this way a very high rate range can be covered. A typical practical limit is $\pm/1300$ deg/sec for a single $2\pi$ jump, but the second jump will give a range $\pm/1900$ deg/sec and so on. As long as the rate is less than $\pm/670$ deg/sec at switch on, then the phase is accurately known and can be tracked thereafter. The output data, with a data rate of 1000 times/sec and a maximum data latency of 1 millisecond, can then be transferred over a fast serial port to a host processor.

The master clock 15 also provides a signal to a control logic unit 23 which has a sync input 23a and a sync output 23b. This control logic unit provides output control signals to the counter 19, histogrammer 20 and digital signal processor 21 in the case of the FIG. 2 example to the digital signal processor 21, histogrammer 20 and via the digital signal processor 21 to the counter 19. The processing means also includes a boot Prom 24, a two bit register 25, an ADRS decoder 26, a DIP SW 27 and a buffer 28 providing an output to the serial interface. The phase modulation amplitude and the rate corrected for phase modulation amplitude effects are calculated from the frequency components at modulation frequency, double modulation frequency and quadruple modulation frequency. The gyroscope of the present invention provides a relatively low cost high accuracy alternative to a conventional closed loop fibre optic gyroscope in which the use of a fast ADC 13 provides very good accuracy in the values of the frequency ratios taken because the frequency data is taken at the same time by common electronics. The use of the histogrammer 20 enables the data rate into the digital signal processor 21 to be slowed down by averaging over a sample interval and thus removing noise without loss of signal or resolution of small rates. The digital signal processor 21 which can be used is a low cost item which calculates the rate and outputs the data at a suitable data rate which is typically 1,000 times per second.

Additionally the signal processing does not depend on the phase of the phase modulator to within $\pm/\pi$. This is achieved by extracting the real and imaginary parts of the Fourier transforms at modulation frequency, double modulation frequency and quadruple modulation frequency by the use of a synchronous detection system allowing the determination of the modulus of the frequency component. By employing telecommunication grade optical fibre for the coil or ring and for the piezo phase modulator 7 the cost of the system is reduced as well as achieving a good scale factor performance of better than 0.1 percent linearity over the rate range of $\pm/1,000$ degrees/second can be achieved. The accuracy can be extended for the gyroscope of the invention by extending the rate range beyond $\pm/\pi$ by identifying the two $\pi$ phase jumps and performing a software correction.

Various modifications and alterations may be made to the embodiments of the present invention described and illustrated, within the scope of the present invention as defined in the following claims.

What is claimed is:

1. An optical gyroscope, including:
   means defining a coil or ring around a sensing axis, around which coil or ring light may propagate in clockwise and counter-clockwise directions
   beam input means for inputting a clockwise beam and a counter-clockwise beam of light into the coil or ring to propagate in opposite directions around the coil or ring,
   a phase modulator for generating and applying a phase modulation at a modulation frequency between the clockwise and counter-clockwise beams, means for combining the clockwise and counter-clockwise beams after passage around the coil or ring, detector means for detecting the combined clockwise and counter-clockwise beams, and processing means for monitoring the intensity of the output of the detector means at a plurality of integral multiples of the modulation frequency to determine the rate applied to the gyroscope, which processing means includes an analogue to digital converter for receiving the analogue output of the detector means and providing a digital output data stream which contains integral multiples of the modulation frequency, a data accumulation device for receiving the output data stream, dividing it into a number of time samples and accumulating a succession of time samples over a number of cycles of the modulation frequency to improve the signal to noise ratio of selected integral multiple frequencies in the received data stream, means for synchronising modulation frequency to the analogue to digital converter sampling frequency and to the data accumulation device frequency, and a digital signal processor for receiving data from the data accumulation device, extracting therefrom frequency components at modulation frequency, double modulation frequency and quadruple modulation frequency, and calculating therefrom the rate corrected for phase modulation and amplitude effects.

2. An optical gyroscope according to claim 1, wherein the analogue to digital converter is a 12 bit converter operable to receive the detector means output with the three frequency components at modulation frequency, double modulation frequency and quadruple modulation frequency, via a preamplifier which outputs a phase modulated spectra of even and odd harmonics of the fundamental at modulation frequency direct to the analogue to digital converter via a single analogue channel.

3. An optical gyroscope according to claim 1, wherein the data accumulation device is a histogrammet.

4. An optical gyroscope according to claim 1, wherein the means defining the coil or ring is a telecommunications grade optical fibre.

5. An optical gyroscope according to claim 4, wherein the source of light for the optical fibre is a light emitting diode or a super luminescent diode.

6. An optical gyroscope according to claim 5, wherein the phase modulator includes a cylinder of piezoelectric material around-which is wrapped and secured thereto part of the optical fibre, and means for applying a voltage to the cylinder.

7. An optical gyroscope according to claim 1, wherein the data accumulation device is governed by an algorithm which is implemented in software.

* * * * *